Patented Dec. 8, 1936

2,063,628

UNITED STATES PATENT OFFICE 2,063,628

PROCESS FOR TREATING FRUITS

Helen Rea Rutledge, Rockford, Ill.

No Drawing. Application July 28, 1933,
Serial No. 682,665

20 Claims. (Cl. 99—103)

My invention relates to the art of artificially ripening fruits and with the coloring thereof, and deals more particularly with the ripening of the so-called citrous fruits.

This is a continuation in part of my application, Serial No. 349,912, filed March 25, 1929, entitled "Process for ripening citrous fruits".

Since time immemorial various processes have been used for the artificial coloring and ripening of fruits in storage. The Chinese have exposed the fruit to the gases obtained from burning incense. In more recent times in this country the "sweating" process has been used, involving the storage of fruits and vegetables at warm temperatures which speeds up the chemical changes taking place therein and results in a fruit or vegetable having many of the same characteristics as the naturally ripened product. It was found, however, that this ripening process could be materially accelerated by exposing the fruit to various gases such as the exhaust from internal combustion engines and the waste gases from blue flame kerosene burners. Upon investigation it was found that the efficacy of the gases for this purpose was due in a large measure to the presence of unsaturated gaseous hydrocarbon compounds and principally to ethylene, perhaps because of its greater concentration in these waste gases.

As a result of this discovery ethylene gas mixed with air in low concentrations was used for the production of desirable coloring in immature lemons. Shortly thereafter it was discovered that this process was also applicable to the ripening of other fruits and vegetables more especially bananas, tomatoes and celery. The use of ethylene gas has, however, heretofore been impotent in ripening immature and green citrous fruits. Attempts to ripen these fruits with ethylene have resulted in the production of best of fruit having the appearance of ripeness but retaining all of the acidity and low sugar content of the green fruit. The fruit was colored but no ripening change took place in the body of the fruit.

Various citrous fruit producing States, principally the State of Florida, have enacted laws regulating the shipment of fruits therefrom in order to establish a minimum quality and maintain the fruit standard of the State. Because of these restrictions unscrupulous fruit dealers have imported green and immature fruit from Puerto Rico, Cuba, and other southern countries by way of ports where no such limitations exist as a result of which the fruit dealers of the restricted areas have been deprived of a portion of their market. The dealers are thus permitted to import green and immature fruit and place them upon the market before domestic fruit has matured. A secondary effect of this activity is the creation of a prejudice against the species of fruit by those who inadvertently buy the immature product. There has heretofore been no known method by which immature fruits may be ripened sufficiently to fulfill the requirements of the citrous fruit laws. The benefits to be derived from a process of this kind will be apparent. Citrous fruits reach their full size before they are mature or fulfill the requirements of the citrous fruit laws in Florida, and therefore, if the sugar content could be increased by artificial means there would be a saving of approximately three months' time in getting the fruit onto the market.

In many cases where the trees are too heavily loaded, the fruit drops and this means a loss. This fruit could be treated and saved as well as normal fruit and fruit which does not seem to be ripening properly.

Ethylene has been used in the past for coloring citrous fruits, the maximum concentration being limited to one part of ethylene to 5000 parts of air. This concentration has no effect on the composition of the fruit, but only speeds up the decomposition of the chlorophyll in the peel. It has also been used for the ripening of certain fruits and vegetables which have large carbohydrate reserves and thin skins; such as bananas, tomatoes and celery. The concentration in the latter cases is limited to about one part of gas to 1000 parts of air. Greater concentration is not generally favorable for ripening these fruits. Instructions relative to this process have usually contained specific instructions to the operator not to employ a greater concentration than one part to 1000, since greater concentrations have a detrimental effect upon the fruit.

An important object of my invention is the provision of a process for ripening immature and green citrous fruits in storage. A still further object is the provision of a process for accelerating the action of a gas of the ethylene series.

Another object of the invention is the provision of an improved method for the coloring of citrous fruits.

I have also aimed to provide a novel composition for the treatment of fruit to accelerate the coloring and the ripening thereof.

I have also aimed to provide a process for increasing the sugar content of immature citrous fruits while in storage.

Still other objects of my invention are the provision of means for increasing the ratio between the total solid content of the liquid and the acidity thereof.

I have found that citrous fruit may be colored in substantially shorter time than has heretofore been the case by treating the fruit with a gas of the ethylene series containing a small proportion of ammonia. It appears that ammonia acts somewhat in the nature of a catalyst to increase the speed of the reaction brought about by the ethylene.

For example, I have treated green limes from the same lot with ethylene alone and with ethylene in combination with a small proportion of ammonia, the concentration of ethylene being greater than one part to 1000 parts of air, in the region of one part to 10,000 and at a temperature of about 70° F. Those limes treated with ethylene and ammonia developed a satisfactory color in about seven days, whereas those treated with ethylene alone required ten days to properly color. It will be noted that the time required for coloring will vary somewhat with various factors, such as the length of time the fruit has been off the trees, and the degree of maturity of the fruit, but the above time required for coloring fairly well indicates the general superiority of a mixture of ethylene and ammonia for this purpose.

I have also discovered that in citrous fruits, contrary to the teachings of the prior art, the concentration of ethylene must be increased to concentrations greater than one part to 1000 before ripening of the fruit will be brought about. I do not attempt to explain the reason why this should be the case but my investigations have shown me that if the concentration of the gas is increased to one part in 500 ripening and coloring of green citrous fruit readily occurs. I have also found that the time required for the ripening process is materially shortened if ammonia or ammonia producing compounds be added to the gases in small amounts. It appears from my investigations that ammonia and any other compound which, under the conditions of the process, will liberate ammonia with no ill effects upon the reaction, may be used to accelerate the ripening process. It will, of course, be necessary that the compounds so used be gaseous or capable of being vaporized and mixed with the gas in order to be presented to the fruit, such for example as methylamine. While I do not know, I am led to believe that the accelerating action of ammonia is due to its hydrolyzing effect upon the fruit. Acetylene and propylene may be used in the place of ethylene to accomplish the ripening though ethylene appears to produce a better flavor in the fruit than the former. Propylene appears to produce the best flavor but is too expensive at the present time for use in this connection. My invention is used for the purpose of coloring fruit by subjecting the fruit to a mixture of ethylene and ammonia, the ammonia being present in relatively small quantities. With the exception of the composition the treatment may be carried out in the usual manner by intermittently subjecting the same to the coloring reagent until ripe, the usual precautions with respect to temperature and humidity being taken where practicable.

In the practice of my invention for the ripening of fruit, I place the fruit in a closed room or warehouse which is as nearly air tight as possible. Into this air tight chamber I liberate a quantity of ethylene gas equal in volume to one part in 300 to 800 parts of air, the exact proportion depending upon the character, the condition, or maturity of the fruit. The gases are permitted to mix in the chamber and I may or may not add a small proportion of ammonia or methylamine, only a trace thereof being necessary. The temperature of the treatment rooms is maintained preferably between 65° and 75° F. It is also advisable to maintain the humidity of the gases at a point high enough to prevent drying and shriveling of the fruit. I permit the fruit to remain in contact with the gaseous mixture for approximately twenty-four hours, and then open the chamber to permit the fruit to be aired. Ethylene is then again liberated into air of the chamber. This intermittent airing is not an essential part of the process but I have found that under certain conditions better results are obtained if the fruit is aired and it is possible to more accurately control the concentration of ethylene thereby. The fruit is permitted to remain in contact with the gas until such time as it has developed color and aroma, and has acquired the characteristics necessary to pass the citrous fruit laws. The fruit is tested for maturity according to the rules and regulations of the citrous fruit law of the State of Florida. While I have referred to the fruit laws of Florida, it has been only for purposes of illustration since any suitable method of test may be applied for determining the ripeness of the fruit, the test outlined being the most common. A Brix hydrometer is used for testing the percent of total solids, a proper temperature correction factor being applied. The acidity is found by titrating 25 cc. of the juice against an NaOH or KOH solution 1.0 cc. of which is equivalent to 10 milligrams of anhydrous citrous acid. Phenolphthalein is used as the indicator. The percentage of acid may then be calculated from the total quantity of material present. The ratio between this figure and the total solids determined above represents the ratio specified by the law. This ratio must be greater than an arbitrary standard fixed by the law to indicate that the fruit is mature thereunder.

When by the ethylene treatment the fruit in storage has reached maturity, as indicated by these tests, the treatment thereof may be discontinued. I have found that the period of time required for this treatment varies from 5 to 10 days depending upon the maturity and condition of the fruit.

*Example No. 1.*—Normal grapefruit, green in color, hard, and having no aroma, was treated for seven days with a concentration of one part of ethylene to 500 parts of air. A trace of ammonia was added. At the end of the third day the fruit was yellow and had the aroma characteristic of ripe grapefruit. At the end of seven days the fruit met the requirements of the State of Florida maturity test.

|  | Before treatment | Fruit treated with $C_2H_4$ | Untreated fruit check |
|---|---|---|---|
| Solids | 7.8 | 8.9 | 8.00 |
| Temp. correct | .20 | .20 | .20 |
| Percent total solids | 8.00 | 9.10 | 8.20 |
| Percent acid | 1.53 | 1.38 | 1.49 |
| Ratio | 5.29 to 1 | 6.59 to 1 | 5.50 to 1 |

The minimum ratio for maturity with total solids of 9.1 is 6.45 to 1. The untreated fruit column indicates what happened to fruit held for a like period under like conditions as the treated fruit when no ethylene was used.

*Example No. 2.*—A second test exactly duplicating Example No. 1 except that the ammonia was not added, required nine days to develop the required maturity.

*Example No. 3.*—Fruit which dropped from the tree before mature was treated seven days with concentration of one part $C_2H_4$ to 400 parts of air.

|  | Before treatment | Treated fruit | Untreated fruit check |
|---|---|---|---|
| Solids | 7.5 | 8.6 | 7.8 |
| Temp. correct. | .15 | .20 | .20 |
| Total solids | 7.65 | 8.80 | 8.00 |
| Percent acid | 1.41 | 1.26 | 1.41 |
| Ratio | 5.42 to 1 | 6.98 to 1 | 5.67 to 1 |

Minimum ratio for maturity with total solids of 8.8 is 6.7 to 1.

*Example No. 4.*—Abnormal fruit suffering from a rust disease was treated at a concentration of one part of gas to 400 parts air for ten days.

|  | Before treatment | Treated fruit | Untreated fruit check |
|---|---|---|---|
| Solids | 7.5 | 8.8 | 7.5 |
| Temp. correct. | .05 | .15 | .15 |
| Total solids | 7.55 | 8.95 | 7.65 |
| Percent acid | 1.38 | 1.30 | 1.40 |
| Ratio | 5.47 to 1 | 6.88 to 1 | 5.46 to 1 |

Minimum ratio for maturity with total solids of 8.95 is 6.6 to 1.

Fruit which is not quite mature may be caused to meet the requirements of the maturity test by treating it with a concentration of about one part of ethylene to 700 parts of air for about three days. The number of days required for this treatment will, of course, vary according to the stage of maturity of the fruit being treated. Though the examples show the results of the treatment of grapefruit the process is equally applicable to all citrous fruits, even limes being ripened with equal facility.

Attention is directed to the fact that I have provided a process for materially increasing the rate of coloring of fruits over that heretofore known wherein a small percentage of ammonia is added to a gas of the ethylene series to produce a coloring and ripening agent capable of bringing about the coloring in a materially shorter period of time. I have also produced a new composition or reagent for the treatment of fruits for the purpose of ripening and coloring the same which consists of a mixture of a gas of the ethylene series such as ethylene with a small proportion of ammonia, or ammonia producing compound, which, when liberated in the atmosphere containing the fruit to produce certain ranges of concentration, bring about either the coloring or the ripening of the fruit.

It will be seen that one phase of my invention depends for its success upon increasing the concentration of ethylene beyond that previously used in the coloring of fruits. It has heretofore been considered highly detrimental to the quality of the resulting fruit to employ a greater concentration of ethylene than one part in 1000. This concentration, however, has been entirely ineffectual in causing citrous fruits to ripen. If, however, the concentration is increased to one part in 700, the sugar content of the fruit is gradually increased and the acidity thereof noticeably decreased. The time required for the treatment varies greatly depending upon the condition of the fruit and the temperature. Not only is the composition changed but also the color and the aroma.

It will be seen that by the use of my process citrous fruits normally falling from trees too heavily loaded which have heretofore been discarded, a total loss, may be artificially ripened and prepared for human consumption. A considerable saving in time is effected since citrous fruits generally reach their full size about three months before maturity and may be removed from the trees, treated by my improved process, and marketed.

It will, of course, be understood that the concentration and the time of treatment must be varied considerably within the limits set forth depending upon the condition of the particular fruit being treated.

I am aware that numerous changes and alterations may be made in my process as outlined above without materially departing from the spirit and scope of the invention as set forth in the appended claims but I do not desire to limit them except as required by the prior art.

I claim:

1. A process for ripening citrous fruits comprising subjecting the immature fruit to the action of an unsaturated hydrocarbon gas, in concentration greater than one part in 1000 parts of air, to increase the solid to acid ratio of the fruit.

2. A process for ripening citrous fruits comprising subjecting the immature fruit to the action of an unsaturated hydrocarbon gas at temperatures between 60 and 80° F., in concentration greater than one part in 1000 parts of air, to increase the solid to said ratio of the fruit.

3. A process for ripening citrous fruits comprising subjecting the fruit to the action of a gas of the ethylene series in concentrations greater than one part in 1000 parts of air, for a period of time dependent upon the maturity of the fruit.

4. A process for ripening citrous fruits comprising subjecting the fruit to the action of a gas of the ethylene series in concentrations greater than one part in 1000 parts of air at a temperature between 60 and 80° F., for a period of time dependent upon the maturity of the fruit.

5. In the ripening of citrous fruits, the process of increasing the ratio of solid to acid which includes intermittently subjecting the fruit to the action of ethylene gas in concentrations between about one part in 300 and one part in 800 of air, until the solid to acid ratio of the fruit reaches or exceeds a predetermined figure.

6. A process for ripening citrous fruits comprising subjecting the fruit to the action of ethylene gas in concentrations between about one part in 300 and one part in 800 of air at a temperature between 60 and 80° F., until the solid to acid ratio of the fruit reaches or exceeds a predetermined figure.

7. A process for ripening citrous fruits comprising intermittently subjecting the fruit in a closed container, until ripe, to a gas of the ethylene series in concentrations between one part of the gas to 300 parts of air and one part of gas to 800 parts of air, and adding a small quantity of an accelerator, capable of liberating ammonia.

8. A process for ripening citrous fruits comprising intermittently subjecting the fruit in a closed container, until ripe, to a gas of the ethylene series in concentrations between one part in 300 and one part in 800 of air at a temperature of above 65° F., and adding a small quantity of ammonia.

9. A process for ripening grapefruit comprising intermittently subjecting the fruit in a closed container, until ripe, to a gas of the ethylene series in concentrations between one part in 300 and one part in 800, and adding a small quantity of ammonia.

10. The process of ripening citrous fruits which includes increasing the ratio of solid to acid by treating the fruit with a gas of the ethylene series in concentrations between about one part in 300 and one part in 800 of air, for a period of time dependent upon the maturity of the fruit.

11. The process of ripening grapefruit which includes increasing the ratio of solid to acid by treating the fruit with a gas of the ethylene series in concentrations between about one part in 300 and one part in 800 of air, for a period of time dependent upon the maturity of the fruit.

12. A process for treating citrous fruits to mature the same comprising intermittently subjecting the fruit until ripe to a mixture of a small quantity of ammonia with a gas of the ethylene series in concentration between about one part in 300 and one part in 800 of air.

13. A composition for the treatment of citrous fruits comprising a mixture of a small proportion of ammonia with a gas of the ethylene series.

14. A process for treating citrous fruits comprising intermittently subjecting the fruit until colored to a mixture of air with a reagent comprising a small quantity of ammonia and a gas of the ethylene series.

15. A process for treating citrous fruits to color the same comprising intermittently subjecting the fruit until colored to a mixture of a small quantity of ammonia with a gas of the ethylene series in concentration less than about one part in 1000 parts of air.

16. A process for coloring citrous fruits comprising intermittently subjecting the fruit until colored to a gaseous mixture consisting of air, a gas of the ethylene series, and a small proportion of ammonia.

17. A process for coloring citrous fruits which comprises subjecting them until colored to a mixture of air with a reagent comprising ammonia and a gas of the ethylene series.

18. A process of accelerating the production of the natural ripe color of citrus fruit comprising subjecting the citrus fruit to the action of ammonia in gaseous form.

19. The process of producing a deeper maturer material coloring upon colored areas of the rinds of mature and immature citrus fruit, comprising confining the citrus fruit in a closed chamber, then introducing into the chamber into contact with the fruit a quantity of ammonia in gaseous form.

20. A coloring process for accelerating the production of the natural ripe color of citrus fruit, for use in conjunction with and simultaneously with a conventional degreening process, comprising subjecting citrus fruit to the action of ammonia in the gaseous form at prevailing pressure and temperature.

HELEN REA RUTLEDGE.